United States Patent [19]

Iguchi et al.

[11] Patent Number: 4,954,734

[45] Date of Patent: Sep. 4, 1990

[54] THREE PHASE ALTERNATOR WITH COMMON NEUTRAL LEADS

[75] Inventors: Kazuyoshi Iguchi; Tashima, Masatoshi; Ryoichi Tazi; Soichi Yoshino; Motoo Yagi, all of Hyogo, Japan

[73] Assignee: Mitsubishi Denki Kabushiki Kaisha, Tokyo, Japan

[21] Appl. No.: 199,074

[22] Filed: May 26, 1988

[30] Foreign Application Priority Data

May 26, 1987 [JP] Japan .................................. 62-130223
May 27, 1987 [JP] Japan .................................. 62-134293

[51] Int. Cl.⁵ ..................... H02K 15/04; H01R 13/415
[52] U.S. Cl. ........................................ 310/71; 29/596; 310/68 D; 310/208
[58] Field of Search ................ 29/598, 596; 174/84 C, 174/87, 94 R; 310/68 R, 68 D, 71, 200, 208, 68 C, 51

[56] References Cited

U.S. PATENT DOCUMENTS

| | | | |
|---|---|---|---|
| 3,183,025 | 5/1965 | Lynch, Jr et al. | 174/84 C |
| 3,242,256 | 3/1966 | Jugle | 174/84 C |
| 4,525,023 | 6/1985 | Lawson | 439/849 |
| 4,602,424 | 7/1986 | Kindig et al. | 310/71 |
| 4,720,645 | 1/1988 | Stroud | 310/68 D |

Primary Examiner—Peter S. Wong
Assistant Examiner—D. L. Rebsch
Attorney, Agent, or Firm—Sughrue, Mion, Zinn, Macpeak & Seas

[57] ABSTRACT

A stator of a vehicle mounted alternator having a rotor and a rectifier includes an armature core formed in an inner periphery thereof with a plurality of slots and three-phase armature coils wound in respective slots, coil lead terminals and a neutral lead terminal of the armature coils for each phase being arranged in a limited area so that connections thereof to said rectifier of the alternator are facilitated. The neutral leads for three phases are derived directly at a position between the coil leads, and at least one metal binder for bundling and electrically connecting the neutral leads together at the point is provided, from which a neutral lead terminal to be connected to the rectifier is derived.

4 Claims, 8 Drawing Sheets

THREE PHASE ALTERNATOR WITH COMMON NEUTRAL LEADS

BACKGROUND OF THE INVENTION

The present invention relates to a stator of a vehicle mounted alternator and, particularly, to a construction of a neutral terminal of an armature coil of a three-phase alternator.

Figure 9:
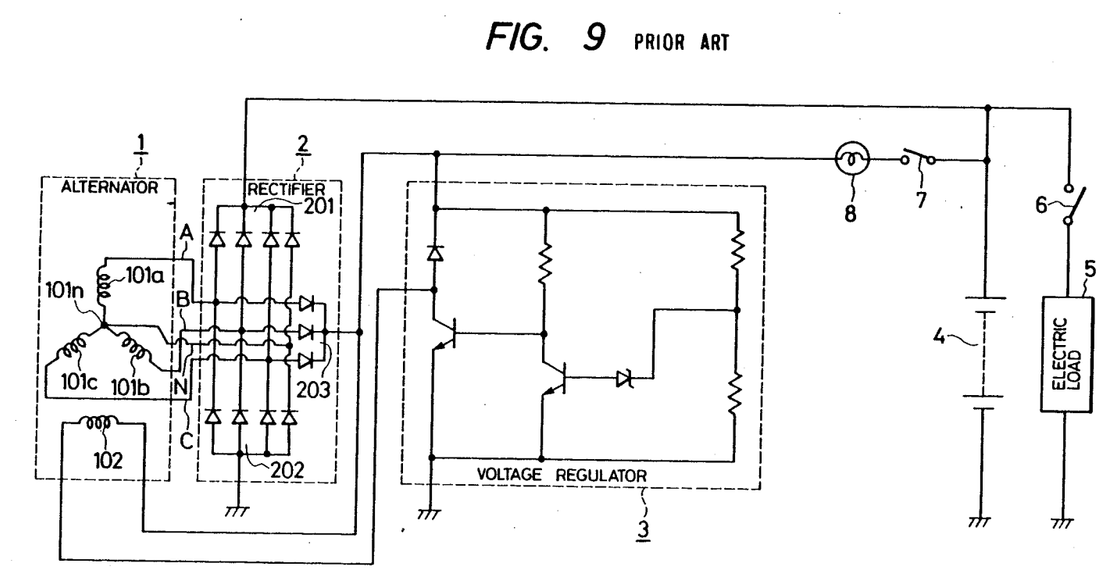
FIG. 9 is a circuit diagram of a conventional device.

FIG. 9 shows an electric circuit of an example of a conventional alternator of such type. In FIG. 9, reference numeral 1 depicts a three-phase alternator, 101a, 101b and 101c armature coils for respective phases whose lead terminals are represented by letters A B and C, 101n a common neutral point of the respective phases with lead terminal N and field coil 102; full-wave rectifier 2 composed of a first rectifier element 201, a second rectifier element 202 and a third rectifier element 203 for rectifying an ac output of the alternator 1; voltage regulator 3 for regulating the output of the alternator 1 by switching field current of the field coil 102; battery 4, electric load 5, switch 6 for the load, key switch 7 and battery charge indicator 8.

Figure 10:
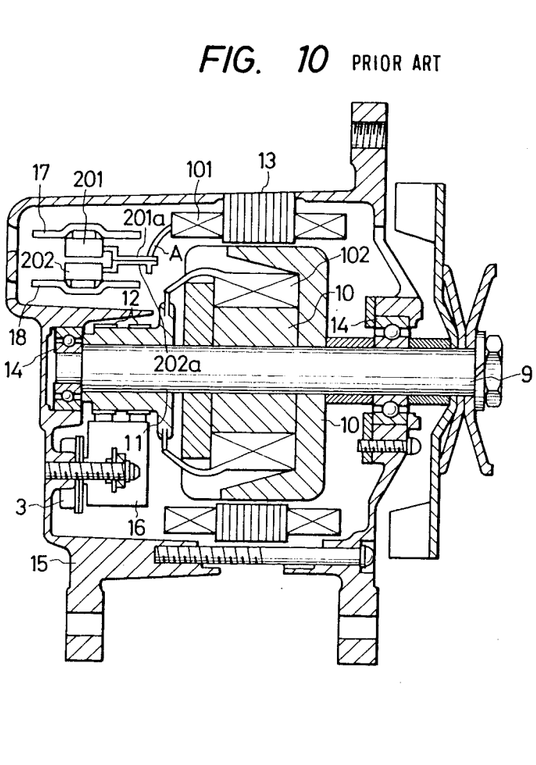
FIG. 10 is a section showing the conventional device.
Figure 11:
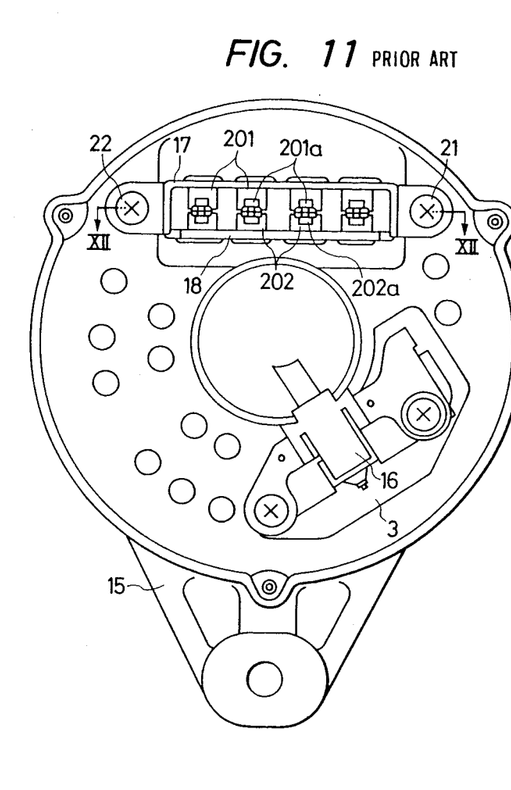
FIG. 11 is view of the conventional device.
Figure 12:
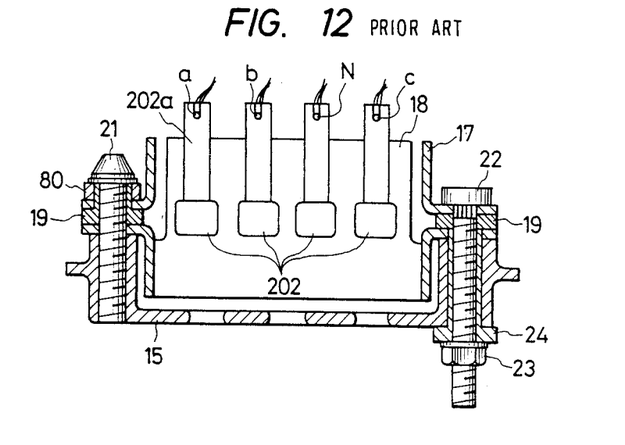
FIG. 12 a cross section taken along a line XII—XII in FIG. 11.
Figure 13:
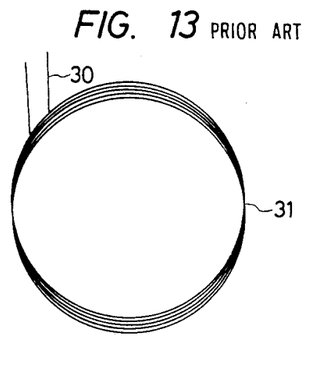
FIG. 13 to 18 show manufacturing steps of the conventional device.
Figure 14:
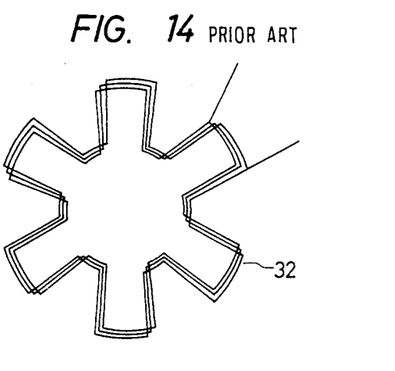
Figure 15:
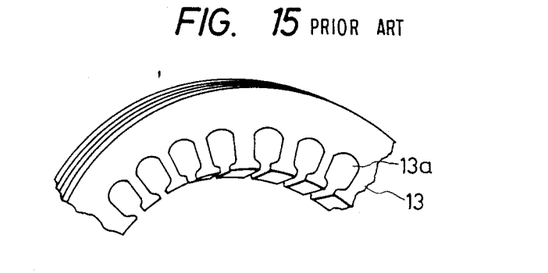
Figure 16:
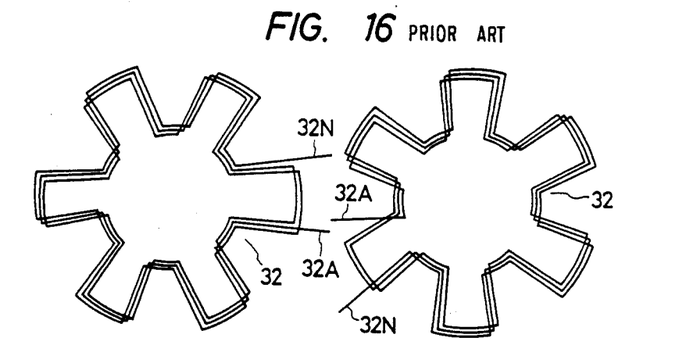

FIGS. 10 to 12 show an example of the conventional alternator structure, in which a reference numeral 9 depicts a rotary shaft to be driven by an engine (not shown) and 10 a field core fixedly mounted on the rotary shaft 9 on which the field coil 102 is mounted. Cylindrical mold member 11 is fitted on the rotary shaft 9, in an outer periphery of which a pair of slip-rings 12 are fixedly supported. The slip-rings 12 are connected electrically to opposite ends of the field coil 102. Annular armature core 13 is arranged in an opposing relation to the field core 10 with an annular radial gap therebetween. The annular armature core 13 is formed on an outer periphery thereof with a plurality of slots 13a in which armature coils 101a, 101b and 101c are arranged. Bearings 14 are for the rotary shaft 9, brackets 15 for supporting the rotary shaft 9 through the bearings 14 and a brush holder 16 is integrally formed with the voltage regulator 3 and mounted on the brackets 15. Cooling fin 17 is on a positive side of the full-wave rectifier 2 and cooling fin 18 on a negative side of the rectifier in an opposing relation to the cooling fin 18 radially. Positive terminal plates of the first and the second rectifier elements 201 and 202 of each phase and negative terminal plates thereof are soldered to the cooling fins 17 and 18, respectively.

The first and the second rectifier elements 201 and 202 are arranged opposingly between the cooling fins 17 and 18 and their lead wires 201a and 202a from terminals fixed thereto are derived in the same direction. By soldering the lead terminals A, B, C and N of the armature colis 101a, 101b, 101c and the neutral point to the terminal lead portions of the first and the second rectifier elements of each phase, wirings of the first and the second rectifier elements 201 and 202 and the coils 101a, 101b and 101c of the armature are compeleted simultaneously.

Although the third rectifier element 203 is arranged between the cooling fins 17 and 18 and connected to the lead terminals A, B and C, details thereof are omitted in this description since it is out of the scope of this invention. The positive side cooling fin 17 is electrically isolated from the negative side cooling fin 18 by an insulating material 19, as shown in FIG. 12.

The fullwave rectifier 2 constituted as above is secured by a screw 21 through an insulating material 20 and an output terminal bolt 22 with a nut 23 through an insulating material 23 to the bracket 15.

In FIGS. 13 to 20 which show a rotor, i.e., an armature of a conventional vehicle mounted alternator, reference numeral 31 depicts a coil unit formed by winding coils 30 circularly the number of turns being necessary for a phase, e.g., 6 turns, 32 a coil member formed by shaping the coil unit 31 into a gear shape by a shaper (not shown). Two of these coil members 32 are assigned to each phase and thus six of them are required for three phases. 32A and 32N depict lead terminals of the coil member 32 in which 32N is a lead terminal of a neutral point. 33 depicts a stator obtained by inserting the coil member 32 into slots 13a of the armature core 13, 34 coil ends, 35 a wedge inserted into each of the slots 13a, 36 a protective tube for a junction of three neutral leads 32N of each phase and 37 a lead portion formed by neutral leads from the respective protective tubes 36 and forming the neutral lead terminal N.

Figure 17:
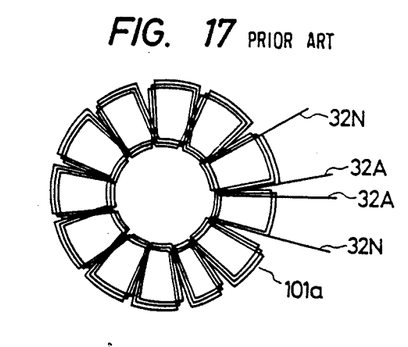
Figure 18:
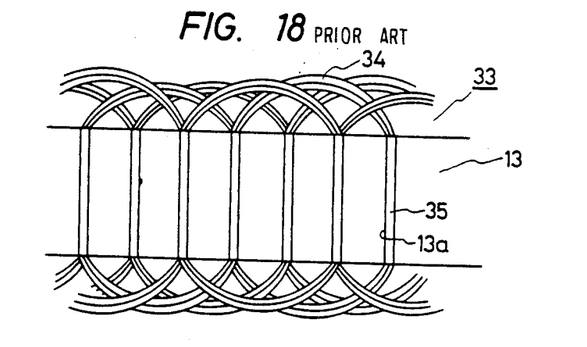
Figure 19:
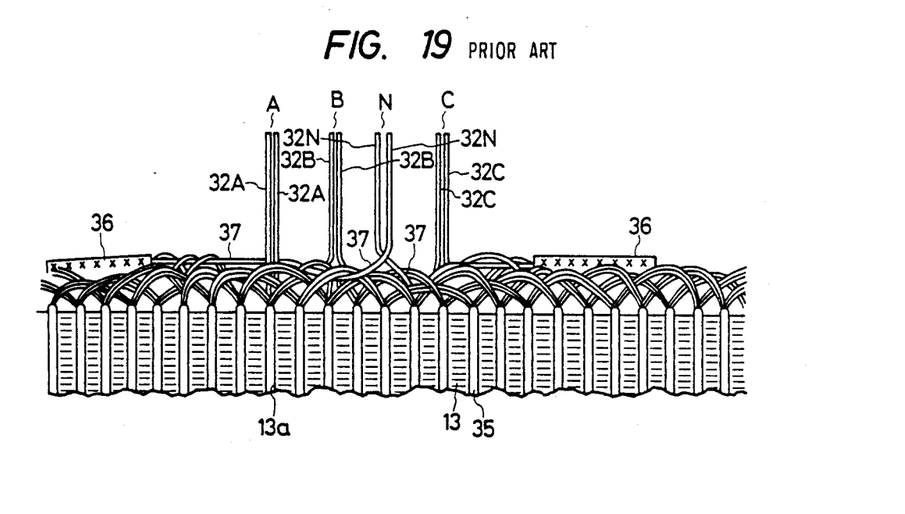
FIG. 19 is a view of a main portion of a stator of the conventional device.
Figure 20:
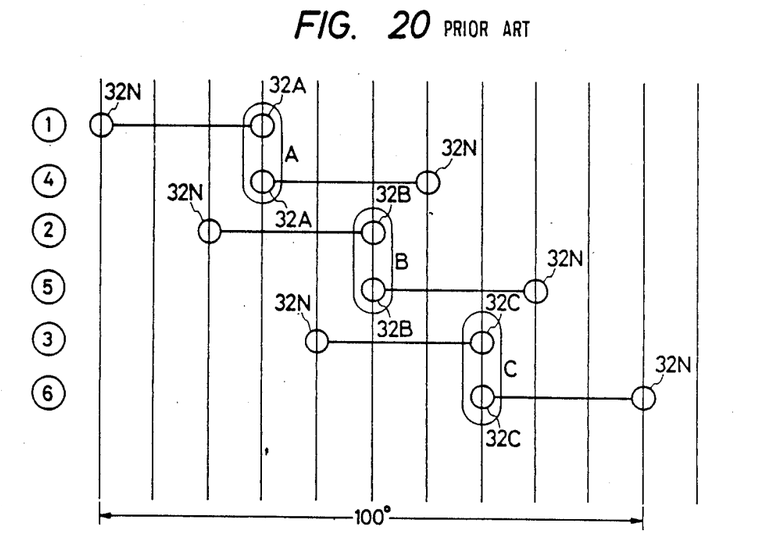
FIG. 20 shows a construction of the main portion of the conventional device.

In manufacturing the armature mentioned above, the coil unit 31 is first formed by winding coils 30 the requisite times for one phase. Then the coil unit 31 is shaped by the shaper into the gear configuration to form the coil member 32. Two of the coil members 32 are paired and combined such that lands of one coil member 32 oppose valleys of the other as shown in FIG. 17 and inserted into the slots 13a of the armature core 13, sequentially, as shown in FIG. 18. In FIG. 20, the circled numerals ①-⑥ represent various coils 32 as shown in FIG. 20, coil members ① and ④, ② and ⑤ and ③ and ⑥ are paired respectively and they are inserted into the 36 slots 13a of the armature 13 in the order of ①, ④, ②, ⑤, ③ and ⑥. Thereafter, three neutral leads 32N of the respective coil members (1), (4) and (2) are connected together by soldering, from which the lead portion 37 extends through the coil end 34 to a position between the lead terminals B and C of the respective phases. Three neutral leads 32N of the coil member ⑤, ③ and ⑥ are connected together by soldering, from which a lead portion 37 is derived and positioned similarly. These two lead portions 37 constitute the neutral lead terminal N. Note, in FIG. 20, the lead terminals A, B and C, respectively, are denoted by ovals.

In the stator of the conventional vehicle mounted alternator constructed as mentioned above, the neutral lead terminals 32N of the armature coils 101a, 101b and 101c of the respective phases are angularly separated from each other by 100° peripherally of the armature core 13. The vertical lines in FIG. 20 represent 10° increments on the periphery of the armature. Therefore, it is necessary to twist and solder three of the neutral leads 32N for each phase. Further, it is necessary to provide the insulating tube 36 on each of the soldered portions. Also the lead portion 37 must be directed through the insulating tube and passed through the coil end 34 so that the position of an end portion thereof is maintained stably. Thus, the formation of the lead terminal N of the conventional armature requires a number of manual operations, causing automatic assembling to be impossible. Further, the neutral leads 32N of the armature coils 101a, 101b and 101c of each phase must be extended peripherally, and relatively long lead portions 37 must be provided. Therefore, the vibration-resistivily of the armature is low, resulting in a degradation of insulation of the respective coils.

SUMMARY OF THE INVENTION

An object of the present invention is to provide a stator of a vehicle-mounted alternator which is capable of being assembled automatically while improving the insulation of the lead wires of the armature coils of each phase.

According to the present invention, the above object is achieved by a stator in which neutral leads of armature coils of each phase are derived directly to a position between lead terminals of the armature coils of the respective phases and ends of the neutral leads are joined together by a metal binder from which a lead terminal to be connected to a rectifier is derived.

The present stator has, therefore, a single joint portion positioned between the lead terminals of the armature coils, at which the neutral leads are connected together reliably. Therefore, the length of neutral leads of each phase to the joint portion can be minimized.

DETAILED DESCRIPTION OF THE PREFERRED EMBODIMENTS

Figure 1:
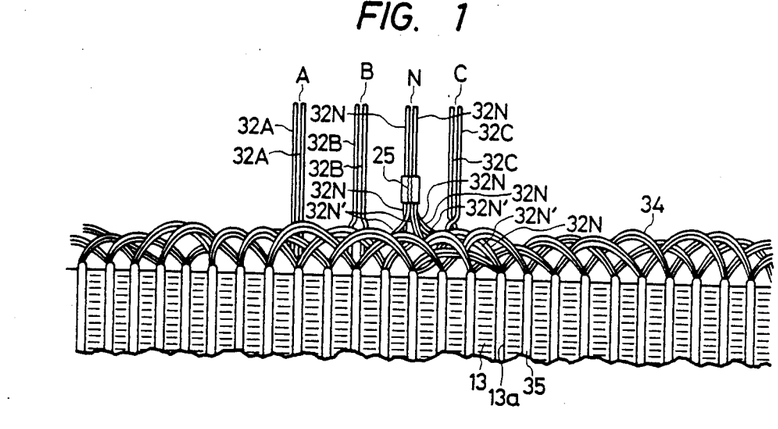
FIG. 1 is a front view of a main portion of a stator of a vehicle mounted alternator according to an embodiment of the present invention.
Figure 2:
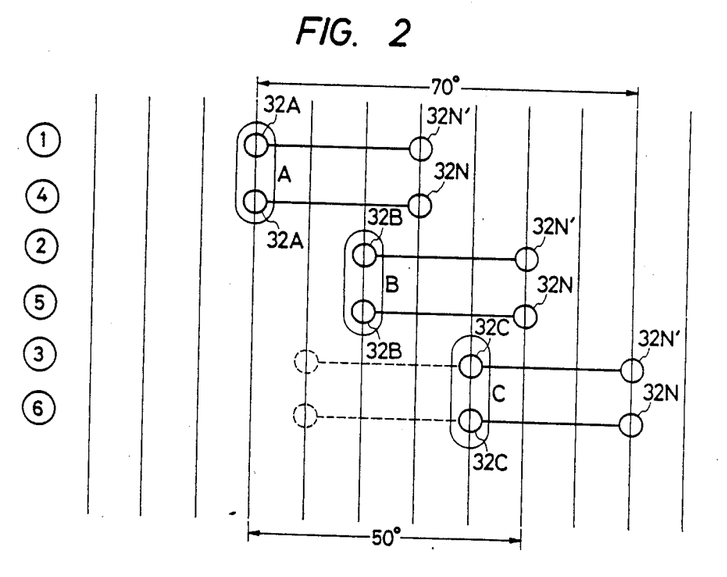
FIG. 2 shows a construction of the main portion shown in FIG. 1.
Figure 3:
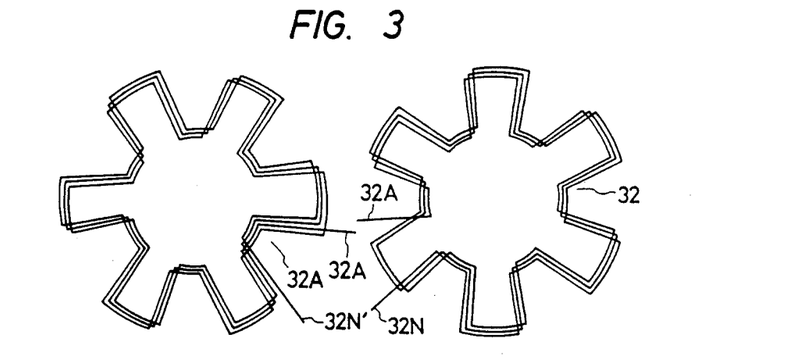
FIGS. 3 and 4 show manufacturing steps of the embodiment shown FIG. 1.
Figure 4:
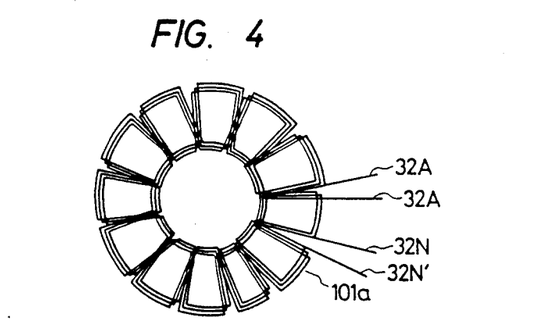

In FIGS. 1 to 3 which show an embodiment of the present invention, 32N depicts a neutral lead of one of paired coil members 32 constituting each armature coil 101a, 101b or 101c of each phase, which are arranged in parallel with each other, and 32N' depicts a neutral lead of the other coil member 32, which is longer by a length corresponding to 60° than the conventional lead. 25 depicts a metal binder for binding and electrically connecting the three leads 32N and the three neutral leads 32N' together. The binder 25 binds the neutral leads 32N and 32N' at a position between lead terminals B of the armature coils 101b and lead terminals C of the armature coils 101c and is caulked and soldered to them integrally. A neutral lead terminal N is formed by two of the neutral leads 32N protruding from the binder 25.

In this embodiment, the lead 32N' of one of two coil members 32 which constitute each armature coil 101a, 101b or 101c for one phase can be inserted into the same slot 13a of an armature core 13 as that into which the neutral lead 32N of the other coil member is inserted, by winding it by 1/6 turn corresponding to 60° more than the conventional coil member, as shown in FIGS. 2 and 3. Again, in FIG. 2, the circled numerals ①-⑥ represent various coils 32, and the ovals denote the lead terminals A, B and C, respectivley. Thus, it is possible to mount the neutral leads 32N and 32N' of the six coil members 32 for three phases within an angle of 40° in an inner periphery of the armature core 13. Again, the vertical lines represent 10° increments on the periphery of the armature.

That is, in this embodiment, since it is possible to arrange the neutral leads 32N and 32N' of the three armature coils 101a, 101b and 101c in the respective slots 13a of the armature core 13 which are close to each other, so that they can be easily bound together at a single position directly, the soldering of them becomes minimum compared with the conventional device in which at least two solderings are required. Further, in this embodiment, there is no need of manually twisting the leads to couple them and leading them through coil ends in positions convenient to gather them. Thus, the wiring of a coil leading portions is facilitated and an automation thereof is facilitated. In addition to these advantages, the bundling and the electrical coupling of the neutral leads 32N and 32N' can be done easily by means of the binder 25 with the aid of caulking. Also, there is no need of providing insulating material on each coupling portion of the neutral leads. Further, since the distance between the coil leads can be minimized, the resultant armature has improved vibration-resistivity and thus is less prone to experience insulation breakdown.

Since, in this embodiment, it is possible to further reduce an angle within which the coil leads A, B and C and the neutral lead terminals N of the armature are positioned, by about 10°, it is possible to minimize the size of a stripper for stripping insulation of the respective leads and to facilitate the stripping works.

Figure 5:
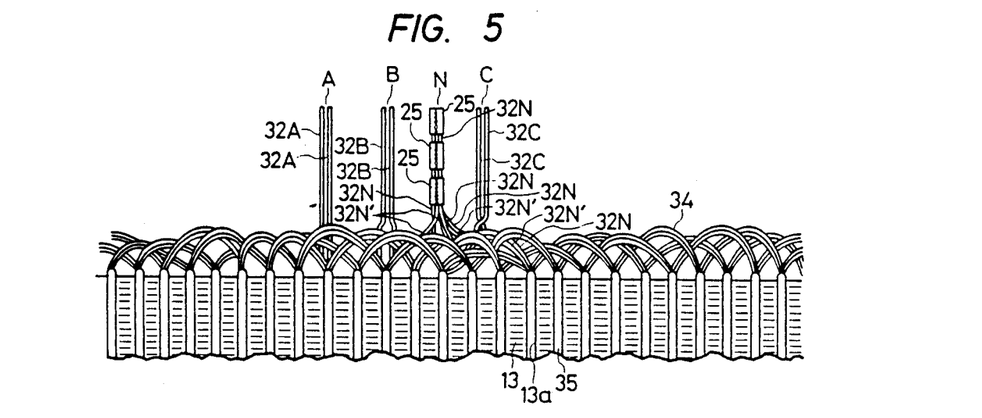
FIGS. 5 to 8 are front views of other embodiments of the present invention respectively.

FIG. 5 shows another embodiment of the present invention. In FIG. 5, the two neutral lead terminals N from the metal binder 25 are further bound and caulked by one or two binders 25 to form a single neutral lead terminal N. In this embodiment, it is possible to reduce the angle within which the neutral leads 32N and 32N' of the armature are arranged to about: 50° by winding the neutral lead 32N' of the coil member ⑥ by 60° more as shown by a dotted line in FIG. 2, resulting in the leads closer to each other.

Figure 6:
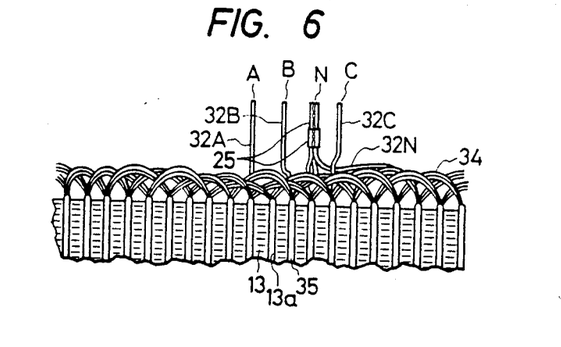

FIG. 6 shows another embodiment of the present invention in which the armature coils 101a, 101b and 101c are made in series to each other. That is, each armature coil 101a, 101b or 101c has a single coil lead 32A, 32B or 32C and a single neutral lead 32N. The three neutral leads 32N are bundled by two metal binders 25 at a position between the coil leads 32B and 32C and soldered together after caulking to form a neutral lead terminal N.

Figure 7:
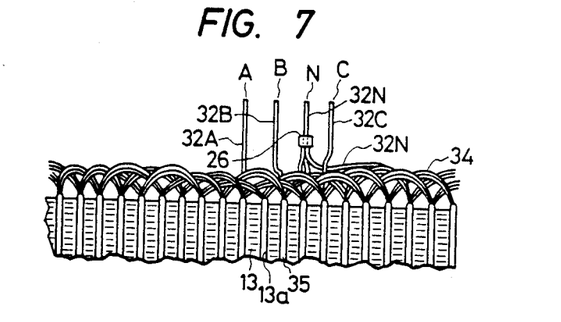

FIG. 7 shows another embodiment in which the three neutral leads 32N are bundled by a metal binder, 26 in the form of a ring and caulked together, from which a neutral lead terminal N in the form of an extension of one of the neutral leads or a separate member is derived.

Figure 8:
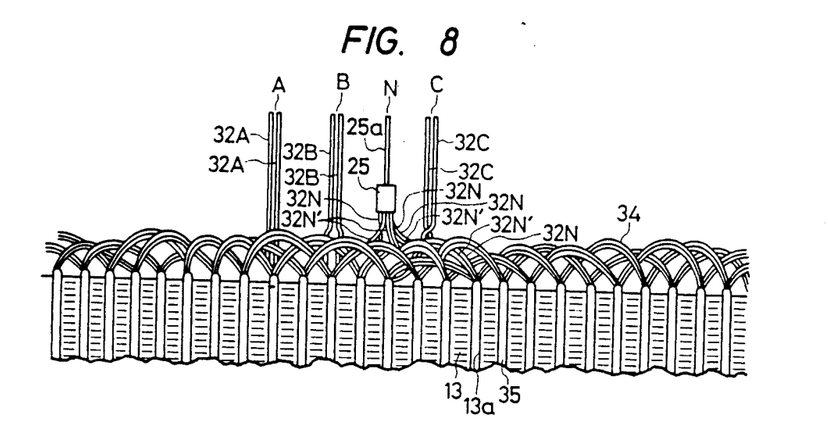

FIG. 8 shows a further embodiment of the present invention which is similar to that shown in FIG. 1 except that the neutral leads 32N and 32N' are bundled by a metal binder 25 and caulked, from which a lead member 25a formed integrally with the binder 25 protrudes to form a neutral lead terminal N.

Although in the respective embodiments, the armature coils 101a, 101b and 101c are arranged in each slot 13a of the armature 13 in opposite directions, the directions of the coils in the slot may changed according to demand.

As mentioned hereinbefore, according to the present invention, the neutral leads of the respective armature coils of three phases are derived directly in between the coil leads and bundled together by the binder from which the neutral lead terminal to be connected to the commutator. Therefore, all of the neutral leads are bundled and electrically connected to each other at a single point which is close to the respective coils easily and reliably. Thus, the assembling operation of the armature can be easily automated while the vibration-resistivity and insulation breakdown of the armature are improved.

What is claimed is:

1. In a stator of a vehicle mounted alternator having a rotor and a rectifier, said stator including an armature core formed in an inner periphery thereof with a plurality of slots and three-phase armature coils wound in respective said slots of said armature core, coil lead terminals and a neutral lead terminal of said armature coils for each phase being arranged in a limited area so that connections thereof to said rectifier of said alternator are facilitated, an improvement comprising said neutral leads of said armature coils for three phases derived directly at a single position between said coil leads of said armature coils, respectively, to thereby minimize the length of said neutral leads of each phase to said single position and at least one metal binder for bundling and electrically connecting said neutral leads together at said point from which a neutral lead terminal to be connected to said rectifier is derived.

2. The improvement as claimed in claim 1, wherein said neutral lead terminal comprises at least one of said neutral leads bundled by said binder.

3. The improvement as claimed in claim 1, wherein said neutral lead terminal comprises an electrically conductive member connected to said metal binder.

4. The improvement as claimed in claim 1, wherein said neutral lead terminal is an extension of said metal binder.

* * * * *